United States Patent

[11] 3,573,597

[72] Inventors Luther L. Genuit
Scottsdale;
John R. Nowell, Phoenix, Ariz.
[21] Appl. No. 888,273
[22] Filed Dec. 29, 1969
[45] Patented Apr. 6, 1971
[73] Assignee General Electric Company

[54] HIGH CURRENT SWITCHING REGULATOR WITH OVERLAPPED OUTPUT CURRENT PULSES
11 Claims, 8 Drawing Figs.

[52] U.S. Cl. ..................................... 321/2,
321/45
[51] Int. Cl. ..................................... H02m 3/22
[50] Field of Search ........................... 321/2,
43—45

[56] References Cited
UNITED STATES PATENTS

| | | | |
|---|---|---|---|
| 3,377,538 | 4/1968 | Stich | 321/2 |
| 3,406,330 | 10/1968 | Pelly | 321/45X |
| 3,443,195 | 5/1969 | Hoffman, Jr. et al. | 321/2 |
| 3,518,526 | 6/1970 | Genuit | 321/2 |
| 3,526,823 | 9/1970 | Genuit | 321/2 |

*Primary Examiner*—William M. Shoop, Jr.
*Attorneys*—Edward W. Hughes, Arnold E. Renner, Frank L. Neuhauser, Oscar B. Waddell and Joseph B. Forman ABSTRACT: A switching regulator circuit is disclosed for use with power supplies supplying a high DC current output. The circuit utilizes a plurality of controlled rectifiers and inductive reactors with sequential gating of the rectifiers at regular intervals for providing overlapped output current pulses from the reactors thereby delivering high output currents with relatively low RMS ripple currents in input and output filter capacitors, as well as relatively lower RMS current through the controlled rectifiers. The reduced RMS value of ripple currents permits the use of input and output filter capacitors and controlled rectifiers having lower ripple current ratings thereby improving the electrical efficiency by reducing resistive losses in the filter capacitors and facilitating a reduction in size and volume for power supplies having a given current rating.

Patented April 6, 1971

INVENTOR.
LUTHER L. GENUIT
JOHN R. NOWELL
BY

HIGH CURRENT SWITCHING REGULATOR WITH OVERLAPPED OUTPUT CURRENT PULSES

BACKGROUND OF THE INVENTION

The present invention relates generally to power supplies and more particularly to power supplies of a switching regulator type which are designated to supply a regulated DC voltage. 1. Field of the Invention The invention is particularly utilized in high speed data processing systems wherein microcircuits are employed to reduce the physical size of the system and to increase the operating speed. The microcircuits are normally assembled in modules, each of which may replace a large number of circuits using discrete circuit components. Each of these microcircuit modules requires as much power as several circuits using discrete components so that the power required in a single cabinet in a data processing system using microcircuit modules is several times larger than the power requirements for a single cabinet of a system using discrete components when the two cabinets have the same physical size. Additionally, high speed microcircuits normally require a much lower value of DC voltage then circuits employing discrete components. For example, in many high speed microcircuits the required DC voltage may be as low as 1 volt. This voltage must be well regulated to provide a constant value of DC voltage for the microcircuits, otherwise variations in DC voltage may produce error signals in the data processing system.

A DC voltage is normally distributed from a power supply at a relatively high voltage but low current to various portions of the data processing system thereby allowing the use of relatively small conductors. This relatively large value of unregulated DC voltage may then be converted to a relatively small value of regulated DC voltage by a plurality of switching regulators which are positioned at a plurality of locations in the data processing system near the microcircuit modules. The switching regulators are preferably located within an equipment cabinet housing the microcircuits, thus, it is desirable to provide more efficient switching regulators having reduced power and thermal losses thereby allowing the regulator to be less bulky and expensive.

Switching regulators comprising a combination of input and output filter capacitors; solid state controlled rectifiers, which may be, by way of example, silicon controlled rectifiers, hereinafter referred to as SCR's; and transformers or inductive reactors are normally employed. A switching regulator of this type is disclosed in a U.S. Pat. application by L. L. Genuit, filed Dec. 16, 1968, Ser. No. 786,823, for a Switching Regulator, which is assigned to the same assignee as the instant invention. An input filter capacitor is employed to serve as a low impedance source for relatively large amplitude current pulses which are switched by a switching device into a relatively high impedance primary winding of a reactor wherein the reactor stores a quantity of energy during an energy recovery period by utilizing output current pulses which are discharged into an output filter capacitor.

The current pulses must be accommodated by input and output filter capacitors and by solid state switching devices which must be appropriately rated to carry maximum input and output current pulse peak variations from an average current value hereinafter referred to as root mean square ripple values and termed "RMS ripple current values." Thus, as the number of microcircuits being supplied current increases, input current pulses with a higher RMS value will be required to provide a corresponding higher average output current derived from output pulses having a higher RMS value. Since the input and output filter capacitors and switching devices increase in size and weight as their current rating increases, the regulator size, weight and cost are significantly increased. The high RMS ripple currents also reduce the electrical efficiency of the regulator. Frequently, as the current requirements increase, the size of the regulator progressively increases to the extent that the regulator must be located in a separate cabinet from the microcircuits or at a remote location thereby requiring larger distribution conductors or "bus" bars. Also termal cooling problems may result from power losses due to low efficiency. Accordingly, it is desirable to maintain the RMS values of these currents as low as possible for a given regulator power or current rating in order to achieve maximum electrical and volumetric efficiency and to reduce regulator cost and current distribution cost. 2. Description of the Prior Art One prior art switching regulator employs a single reactor, a pair of SCR's and a pair of commutating capacitors to convert an unregulated DC voltage, 150 volts, to an accurately regulated DC voltage, such as 1 volt. The SCR's are employed as switches between the source of unregulated DC voltage and the reactor. The high current output pulses are obtained from a secondary winding on the reactor.

In the prior art switching regulator, first and second SCR's are provided in apparatus in which alternate, nonoverlapping operation of the output current pulses is provided. A pulse source is provided for deriving a pair of gate trigger pulses which are used for alternately firing the rectifiers. When either one of the rectifiers is fired, a resulting input current pulse is applied to the single reactor and a resulting current flow through a single center tapped primary winding of the reactors will provide for the establishment of a magnetic flux field which is stored in the reactor and coupled into one or more output or secondary windings. A quantity of energy stored in the reactor is then discharged into the secondary windings and applied through one or more output diodes as an output current pulse to an output filter capacitor.

Since a single reactor is employed, it is necessary for the reactor to fully recover from the pulse supplied from the first rectifier before the second rectifier can be fired to prevent saturating the core of the reactor. The subsequent current pulse in the secondary or output winding cannot be initiated until the termination of the current pulse in the primary winding initiated by the firing of the second rectifier. There is, therefore, a minimum space between output current pulses corresponding to the conduction intervals of the two controlled rectifiers and in the input circuit there is a minimum gap between input current pulses corresponding to the conduction interval of the output pulses constituting the energy recovery period.

In order to obtain a required average output current, the output current pulses supplied by the output diodes must be of sufficient amplitude that the output pulses, when separately combined together in the filtering network, will result in an average output current of a sufficient amplitude to provide the output current rating for which the switching regulator is designed. Since the input and output current pulses are spaced apart, the duty cycle of the current pulses are spaced apart, the duty cycle of the current pulses in the primary and secondary circuits is less than 100 percent and the RMS values of these currents are considerably greater than the average values of input and output currents for the regulator. Therefore, input filter capacitors and output filter capacitors, as well as the SCR, must have high peak current ratings corresponding to a given regulator output current rating. This results in the disadvantages of requiring expensive, large, bulky capacitors and switching regulators which occupy a large volume of space, as well as being heavy and costly. Accordingly, it is desirable to provide a switching regulator having reduced RMS currents in the input and output circuits and lower peak current pulses wherein capacitors and SCR's having lower peak current ratings may be employed.

With the invention disclosed and claimed, the efficiency of the switching regulator is improved because of a significant reduction in the ripple or RMS currents in input and output circuits as realized by providing for overlapping of output current pulses.

SUMMARY OF THE INVENTION

In accordance with the claimed invention, a switching regulator is provided which reduces the need for heavy and bulky filter capacitors and reduces cost by allowing the use of input and output filter capacitors and SCR's with lower peak current ratings. The switching regulator utilizes a plurality of SCR's and a plurality of reactors in an apparatus in which sequential overlapping operation of the output diodes and reactors is provided. A control signal source is provided for firing these SCR's singly and individually at uniform intervals of time thereby applying current pulses from an input circuit through each of the reactors separately.

The control signal source provides a plurality of control signals, each one associated with a corresponding SCR and provided in a sequence relating the energy storage and discharge periods of the reactors such that an input current pulse can be provided to each of the plurality of reactors at a time while another reactor is discharging stored energy thereby resulting in overlapped current pulses being delivered by the secondary windings of at least two reactors. The average output current is, therefore, the summation of transferred current pulses through the plurality of reactors.

Overlapping of current pulses has the effect of increasing the duty cycle of the output current pulses thereby reducing RMS ripple currents in the output circuit. The SCR's are fired individually and sequentially such that a next reactor can be receiving an input current pulse while a reactor responding to a previously fired SCR is still transferring stored energy into a corresponding secondary winding. For this reason it is possible to provide an increased number of input current pulses through the plurality of reactors within a given time interval and, for a given input power level, the amplitude of the input current pulses can be accordingly reduced by appropriate reactor design. A significant reduction in the peak input current pulses required to derive a specific output current is thereby achieved such that input filter capacitors which are required to store energy for application to the reactors may have a lower RMS ripple current rating and also an output filter capacitor receiving the output current pulses similarly may have a lower RMS ripple current rating due to reduced peak amplitude in the output current pulses. Since a lower RMS input current is required, the SCR's may also have a lower current rating.

The physical size of filter capacitors is directly proportional to the ripple current rating, therefore, a substantial reduction in size of filter capacitors is provided by the use of the plurality of reactors. In one form of the invention claimed and disclosed, linear reactors are preferrable thereby further reducing the physical size and weight of the switching regulator, as well as providing for improved manufacturability and reduced cost over reactors utilizing a biased reactor having additional windings to maintain operating characteristics.

Efficient utilization of a plurality of reactors, a plurality of SCR's and a signal source for singly, sequentially, and at uniform intervals of time firing the SCR's provides for improved duty cycle operation, as well as a reduction in ripple current. The present invention, by such means, reduces the required ripple current rating of filter capacitors and SCR's and provides for a more efficient switching regulator having reduced size, weight, thermal losses and cost.

It is, therefore, an object of this invention to provide an improved switching regulator.

Another object of this invention is to provide a more efficient switching regulator having reduced size, weight and cost by utilizing reduced pulse current amplitudes to allow use of capacitors and SCR's having reduced current ratings.

Further objects and advantages of the present invention will become apparent to those skilled in the art as the description thereof proceeds.

BRIEF DESCRIPTION OF THE DRAWINGS

The present invention may be more readily described by reference to the accompanying drawings in which.

DETAILED DESCRIPTION OF OPERATION

Figure 1:
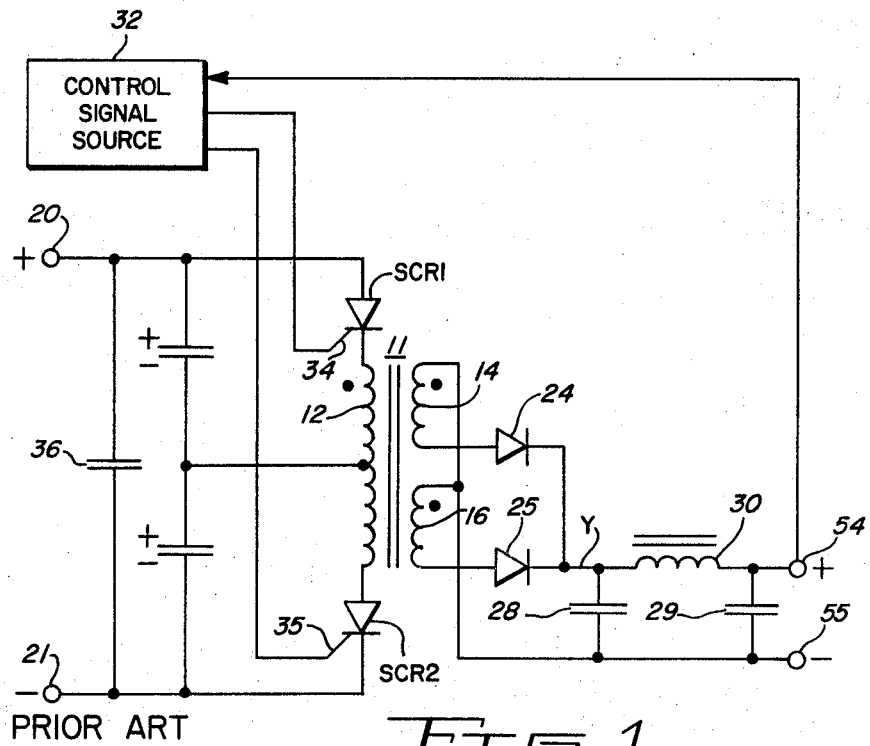
FIG. 1 is a schematic diagram of a prior art switching regulator.

Referring more particularly to the drawings by the characters of reference, FIG. 1 discloses a prior art switching regulator to provide a constant value of DC output voltage for a wide range of values of output current. The prior art switching regulator is described prior to a description of a preferred embodiment of the instant invention to establish prior art operating characteristics for comparison hereinafter.

As indicated in FIG. 1, a single center-tapped reactor 11 comprising a single center-tapped primary winding 12 and a pair of secondary windings 14 and 16 is coupled to a high voltage DC power supply having a positive output terminal 20 and a negative output terminal 21. A pair of silicon controlled rectifiers, SCR1 and SCR2, controls the current supplied by the power supply to the primary winding of reactor 11. The output windings 14 and 16 are each connected to an output diode 24 and 25, respectively, for providing output current to an output filter comprising capacitors 28 and 29 and a filter choke 30. Because the two output windings are coupled to a common reactor core, the two output diodes will conduct at the same time.

Figure 3:
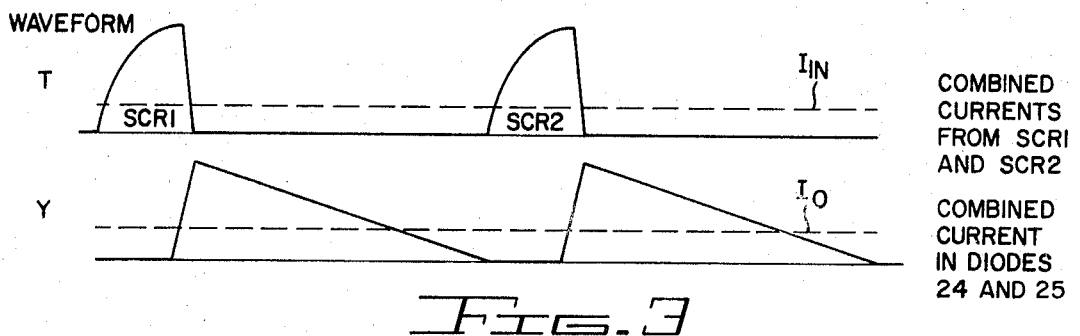
FIGS. 3, 4 and 5 illustrate wave forms which are useful in explaining the operation of the circuits shown in FIGS. 1, 2 and 3.

FIG. 3 illustrates operating current waveforms for the prior art switching regulator of FIG. 1. Waveform T of FIG. 3 illustrates a current waveform representing currents for SCR1 and SCR2 when a control signal from a control signal source 32 is applied singly and successively to gate electrodes 34 and 35 of SCR1 and SCR2, respectively. A suitable source 32 is described in detail hereinafter. Waveform Y illustrates a resulting waveform representing the combined output diode current in diodes 24 and 25 in response to the currents illustrated in waveform T. As is seen in FIG. 3, SCR or input current pulses shown as waveform T must reside at zero during the presence of output diode current pulses shown as waveform Y and the diode current pulses must reside at zero during the presence of SCR1 and SCR2 current pulses. This is a necessary condition since the single reactor must recover from a prior current pulse before a next current pulse is applied to prevent saturation of a core of the reactor. A poor duty cycle for current pulses shown in both waveform T and waveform Y, therefore, results. As illustrated, the poor duty cycles for waveforms T and Y result in high peak pulse current amplitudes and correspondingly high RMS values to produce the necessary average value of input current $I_{IN}$ and the required average value of output current $I_0$ in waveforms T and Y, respectively. The high ripple currents which exist in the circuit of FIG. 1, therefore, require use of an input filter capacitor 36 and output filter capacitor 28 having high ripple current ratings and thereby adversely affect cost, size and electrical efficiency of the switching regulator. These operating characteristics will be discussed further in comparison with the preferred embodiments of the invention which are to be described hereinafter.

Figure 2:
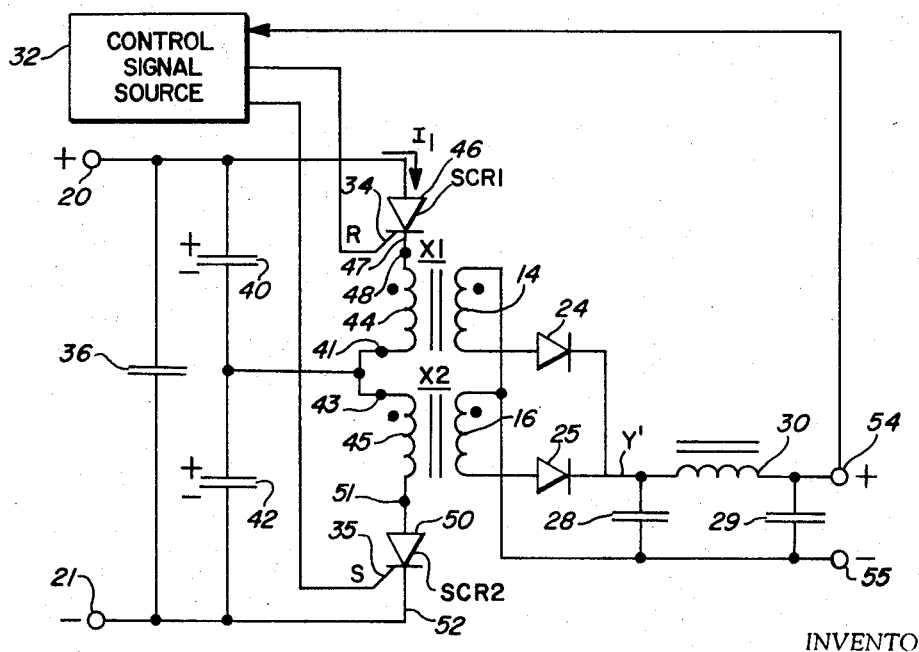
FIG. 2 is a schematic diagram of one embodiment of the instant invention.

In FIG. 2 there is depicted a switching regulator constructed in accordance with the instant invention to provide a constant value of DC output voltage for a wide range of values of input voltage and output current. The switching regulator illustrated in FIG. 2 represents a preferred embodiment of the instant invention wherein like parts corresponding to parts of the regulator illustrated in FIG. 1 have similar reference characteristics. As indicated in FIG. 2, a pair of reactors X1 and X2, each comprising primary windings 44 and 45, respectively, and secondary windings 14 and 16, respectively, is coupled to a high voltage DC power supply having a positive output terminal 20 and a negative output terminal 21.

A pair of silicon controlled rectifiers, SCR1 and SCR2, controls the application of current pulses supplied by the power supply to the primary windings of reactors X1 and X2, respectively. An anode 46 of silicon controlled rectifier, SCR1, is connected to the positive terminal 20 of the high voltage power supply and a cathode 47 of the silicon controlled rectifier, SCR1, is connected to a terminal 48 of the primary winding 44 of reactor X1. SCR1 and reactor X1 are, therefore, connected in series to form a series combination. A gate 34 of the silicon controlled rectifier, SCR1, is connected to a control signal source 32 which provides signal pulses to render rectifier SCR1 conductive. An anode 50 of silicon controlled rectifier, SCR2, is connected to a terminal 51 of the primary winding 45 of reactor X2 and cathode 52 is connected to the negative terminal 21 of the high voltage power supply. SCR2 and reactor X2 are thus connected in series to form a second series combination. A gate 35 of the silicon controlled rectifier, SCR2, is connected to the control signal source 32 which provides signal pulses to render rectifier SCR2 conductive.

Transformers X1 and X2 may be, by way of example, linear inductive reactors. A linear reactor is one having a magnetic core which has a magnetic permeability which is substantially constant over the operating current range so that the application of a magnetizing force H results in a direct proportion of magnetic flux density hereinafter referred to as "flux density B" in the core. A suitable core for a linear reactor may be, by way of example, a "Standard Molybdenum Permalloy Powder Core," Part Number A-094033-2, as marketed by the Arnold Engineering Company, Marengo, Illinois. This core has a substantially constant permeability for flux densities of 4,000 gauss or less. The flux density B is the number of lines of flux per square centimeter of the magnetic core and is determined by the value of the magnetizing force and the type of material used in the core. A discussion of typical magnetization curves for a saturable core can be found in the textbook "Magnetic Circuits and Transformers" by E. E. Staff, M. I. T., 1943, published by John Wiley and Sons, New York, N.Y.

A significant advantage is obtained by using linear reactors in that no biasing of a reactor is required to maintain operation of the reactor within a predetermined range of operating conditions whereby the reactor core will not become saturated. A saving in cost, as well as improved manufacturability is achieved, since no biasing secondary winding or bias power supply is required for controlling the reactor.

Control signal source 32 may include, by way of example, a unijunction transistor and an associated resistor–capacitor timing circuit for deriving control signals for firing rectifiers SCR1 and SCR2. The signal source provides the control signals to gates 34 and 35 of rectifiers SCR1 and SCR2, respectively, in a controlled synchronized time sequence in a manner to be described hereinafter. A suitable control signal source may be, by way of example, similar to that illustrated in FIG. 7.

The operation of the circuit of FIG. 2 will now be described in conjunction with the waveforms shown in FIG. 4. A pair of capacitors 40 and 42 provide predetermined quantities of energy to a respective one of reactors X1 and X2 each time one of the silicon rectifiers, SCR1 and SCR2, is rendered conductive. At a time $t_1$, FIG. 4, a pulse from signal source 32 renders silicon controlled rectifier, SCR1, conductive so that the voltage across capacitor 40 is applied to the primary winding 44 of reactor X1 causing a current $I_1$ to flow from the upper plate of capacitor 40 from anode 46 to cathode 47 and through the primary winding 44 to the lower plate of capacitor 40.

Current $I_1$ through primary winding 44 causes a change in flux in the reactor core which produces a voltage across primary winding 44 which is magnetically coupled to secondary winding 14.

Figure 5:
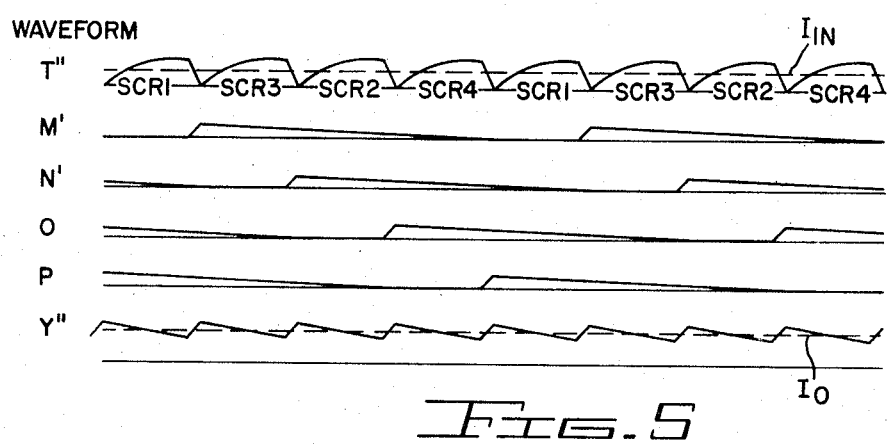

With reference to FIG. 5, between the time $t_1$ and a time $t_2$ primary winding 44 of reactor X1 has a voltage which is initially of a positive polarity at the upper end of the winding and of a negative polarity at the lower end of the winding. Because secondary winding 14 is inductively coupled to primary winding 44, a voltage appears across winding 14 at this time which is also initially positive at the top and negative at the bottom, thus causing diode 24 to be reverse biased so that no current flows through diode 24 or through secondary winding 14. Because SCR2 is in the nonconductive state during this period of time, no current can flow through primary winding 45 of reactor X2. Because capacitor 36 has a very low AC impedance, as compared with the impedances of capacitors 40 and 42, the upper terminal of capacitor 40 is effectively connected to the lower terminal of capacitor 42 and capacitors 40 and 42 are thus effectively connected in parallel for consideration of AC current flow.

Parallel capacitors 40 and 42 form a series resonant circuit with the primary inductance of reactor X1 and the waveform of the current pulse initiated by the firing of SCR1 at time $t_1$ will be sinusoidal at a resonant frequency given by the well-known formula $$f_0 = \frac{1}{2\pi\sqrt{LC}}$$

where L is the inductance of the primary winding of reactor X1 in henries and C is a combined farad rating of capacitors 40 and 42.

Figure 4:
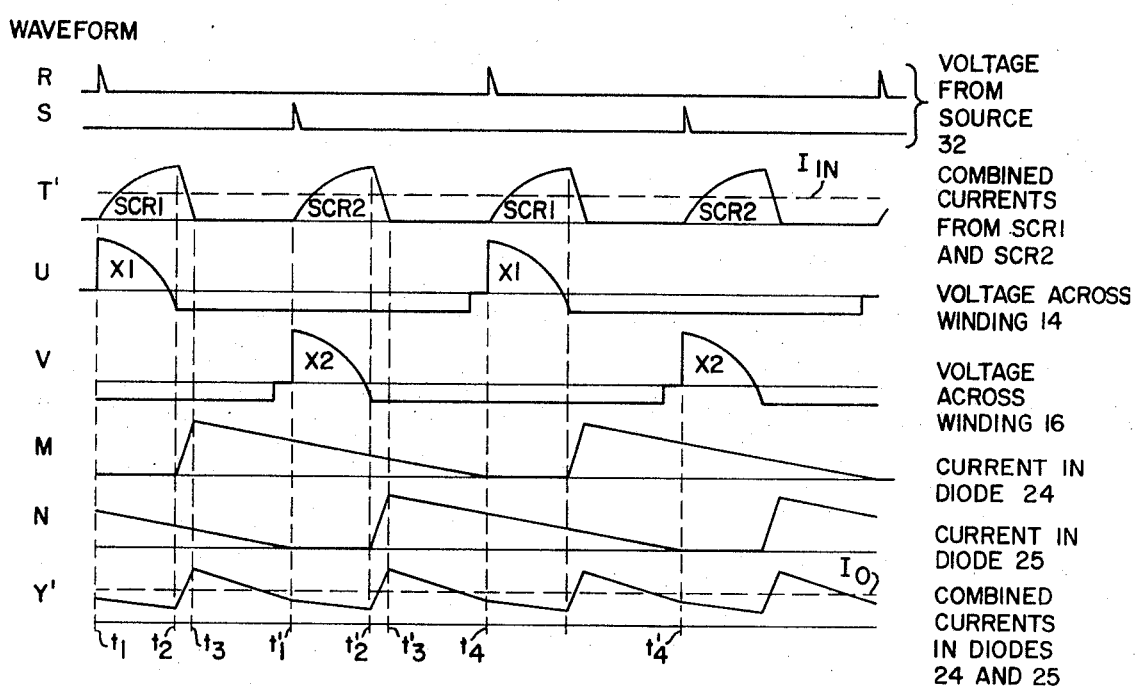

As shown in waveform T' of FIG. 4, the initial rise of current $I_1$ at time $t_1$ is sinusoidal and the voltage across the primary winding 18 of reactor X1 is initially a cosine wave as shown by waveform U of FIG. 4. As the current waveform T' rises sinusoidally to a peak value, the voltage waveform U falls as a cosine function to zero and then builds up to a negative value at time $t_2$ which is sufficient to forward bias output diode 24. During a time interval between $t_1$ and $t_2$, energy is stored in reactor X1 as the current rises to its peak value. After the peak value is passed a portion of this stored energy is returned to capacitors 40 and 42 while the voltage waveform U builds from zero to the negative value reached at $t_2$. At time $t_2$ when diode 24 becomes forward biased, the secondary winding is coupled to the very low impedance of capacitor 28. Because the microfarad rating of capacitor 28 is in the circuit design specified to be several orders of magnitude higher than the combined microfarad ratings of capacitors 40 and 42, current $I_1$ falls rapidly to zero as the current in winding 14 builds up to a peak value.

When current $I_1$ reaches zero at time $t_3$, SCR1 returns to a nonconductive state characterized by a high anode-to-cathode impedance and will remain stable in this state provided sufficient time is allowed prior to reapplication of a forward voltage. The transfer of current from primary winding 44 to secondary winding 14 is shown to occur in FIG. 4 during the period $t_2$ to $t_3$ and the rate of transfer is limited primarily by the leakage inductance between windings 44 and 14. The relationship between the current level in winding 44 prior to this transfer and the current level in winding 14 after the transfer is given approximately by $$N_1 I'_1 = N_2 I'$$

where $N_1$ is the number of turns in primary winding 44, $N_2$ is the number of turns in secondary winding 14, $I'_1$ is the instantaneous value of current in winding 44 at time $t_2$ and $I'_2$ is the instantaneous value of current in winding 14 at time $t_3$.

At time $t_3$ the energy stored in reactor X1 may be calculated by a formula specifying that $$W = \frac{1}{2L_2(I'_2)}2$$

where $W$ is the energy expressed in joules and $L_2$ is the inductance in henries of winding 14 of reactor X1. The formula $$\frac{1}{2L_2(I'_2)}2$$

is a well-known energy formula shown by Leander W. Matsch as formula (4—18) on page 167 of "Capacitors, Magnetic Circuits, and Transformers," Prentice-Hall, Inc., Englewood Cliffs, New Jersey, 1964, This stored energy is released by reactor X1 during period $t_2$ to $t_4$ and is transferred to output filter capacitor 28 which sustains a nearly constant voltage across its terminals because of its very high capacitive or microfarad rating. The voltage across winding 14 during period $t_2$ to $t_4$ is, therefore, essentially constant as illustrated in waveform U of FIG. 4 and the current in winding 14 is constrained to decay at a constant rate as illustrated in waveform M and as indicated by the relationship, $E=Ldi/dt$ in which $di/dt$ must be constant if $E$ and $L$ are constant.

At a time $t_1'$, the control signal source 32 supplies a gate trigger signal to gate 35 of controlled rectifier SCR2 as shown by waveform S of FIG. 4. A current $I_2$ is thereby initiated in winding 45 of reactor X2 which also flows through SCR2 and parallel-connected capacitors 40 and 42. A sinusoidal current pulse flowing in this circuit is identified by reference to SCR2 in waveform T' of FIG. 4 during period $t_1'$ to $t_2'$. This waveform and the coincident voltage waveform V as well as the ensuing current waveform N flowing during period $t_2'$ to $t_4'$, can be explained in the same manner as previously described for a cycle of operation involving SCR1, X1 and diode 24.

Capacitors 40 and 42 deliver substantially the same amount of energy to reactor X1 or X2 each time silicon controlled rectifier, SCR1, or silicon controlled rectifier, SCR2, respectively, is rendered conductive so that the amount of energy delivered to filter capacitors 28 and 29 and the voltage across these capacitors is determined by the frequency of the pulses applied to gates 34 and 35 of rectifiers SCR1 and SCR2. Because energy is drawn from capacitor 29 by the load connected at terminals 54 and 55, load energy must also be supplied through reactors X1 and X2 and the frequency of the pulses supplied by control signal source will vary directly in proportion to load current at a given output voltage.

In FIG 4 waveform Y' represents the algebraic sum of current waveforms M and N flowing through diodes 24 and 25. The average value of waveform Y' is shown by the broken line identified as $I_0$ and represents the DC component of current waveform Y' which flows through filter choke 30 to the load connected across output terminals 54 and 55. The AC component of current waveform Y' is the ripple current flowing through filter capacitor 28.

It is a feature of the instant invention that SCR2 may be fired during the period in which energy is still being released by reactor X1 and SCR1 may be fired while energy is still being released by reactor X2. Thus, under heavy load conditions the current waveforms M and N of FIG. 4 may overlap as shown and the peak values of M and N may, therefore, be lower to produce a given average value $I_0$ for waveform Y' than would be required if M and N could not overlap. Because the regulator circuit can thus be designed for reduced peak currents, the RMS values of ripple currents in both primary and secondary circuits are proportionately reduced. This reduction in RMS ripple currents for a given power rating results in significantly improved electrical efficiency, as well as in reduced physical size and cost.

With reference to FIGS. 3 and 4, the ratio of RMS ripple current to an average DC current is readily seen to be considerably higher for the prior art circuit of FIG. 1 than in the case of an instant invention circuit of FIG. 2. This may readily be recognized by comparing peak-to-peak pulse amplitudes and DC levels as shown by waveforms T and Y of FIG. 3 for the prior art with waveforms T' and Y' of FIG. 4 for the instant invention. In the interest of permitting a direct comparison these waveforms have been shown for regulators of equal input and output DC current levels, that is $I_{IN}$ and $I_0$ of FIG. 3 are equal, respectively, to $I_{IN}$ and $I_0$ of FIG. 4. The peak values of current pulses may thus be compared directly. Such a comparison indicates that peak ripple currents for both SCR's and output diodes in the illustrated embodiment of the instant invention (FIG. 4) are approximately one-half the peak values shown for SCR's and output diodes in the prior art (FIG. 3). This advantage in terms of ripple current for the instant invention results in a two-to-one advantage also in terms of the physical size and cost of input filter capacitor 41 and output filter capacitor 28 of FIG. 2.

Capacitors contribute significantly to the total physical size of the prior art regulator, therefore, a significant volumetric improvement is provided. Also because of the reduced ripple currents the electrical efficiency of the instant invention is greater than that of the illustrated prior art regulator. The electrical efficiency of the illustrated prior art regulator at 5 volts output voltage is typically 50 percent for the instant invention in the same rating is approximately 60 percent. This improvement is important because it contributes additionally to a reduction in physical size but more significantly because it reduces cooling problems for the electrical equipment in which it operates.

It is to be understood that the circuit of FIG. 2 will operated similarly and equally well with SCR1 and SCR2 connected in series with corresponding windings 44 and 45 at terminals 41 and 43, respectively, instead of at terminals 48 and 51 as illustrated. For example, the anode 46 of SCR1 may be connected to terminal 41 and the cathode 47 to the lower and upper plates of capacitors 40 and 42, respectively. The anode 50 of SCR2 may be similarly connected to the lower and upper plates of capacitors 40 and 42, respectively, and the cathode 52 connected to terminal 43 of winding 45. Any combination of having SCR1 connected as described to either of terminals 48 or 41 and SCR2 connected as described to either of terminals 43 or 51 will yield identical circuit response.

In a similar manner identical circuit response may be obtained for the circuit illustrated in FIG. 2, by changing the positions of diodes 24 and 25. Such a change in position will involve connection of a cathode electrode or cathode to a winding end rather than connection of an anode electrode or anode to a winding end. For example, the cathodes of diodes 24 and 25 may be connected to an opposite end of secondary windings 14 and 15, respectively, from the end to which the anodes are illustrated as being connected in FIG. 2. The capacitor 28 would then be connected between the anodes of diodes 24 and 25 and the ends of windings 14 and 15 to which the anodes are illustrated as being connected in FIG. 2.

Figure 6:
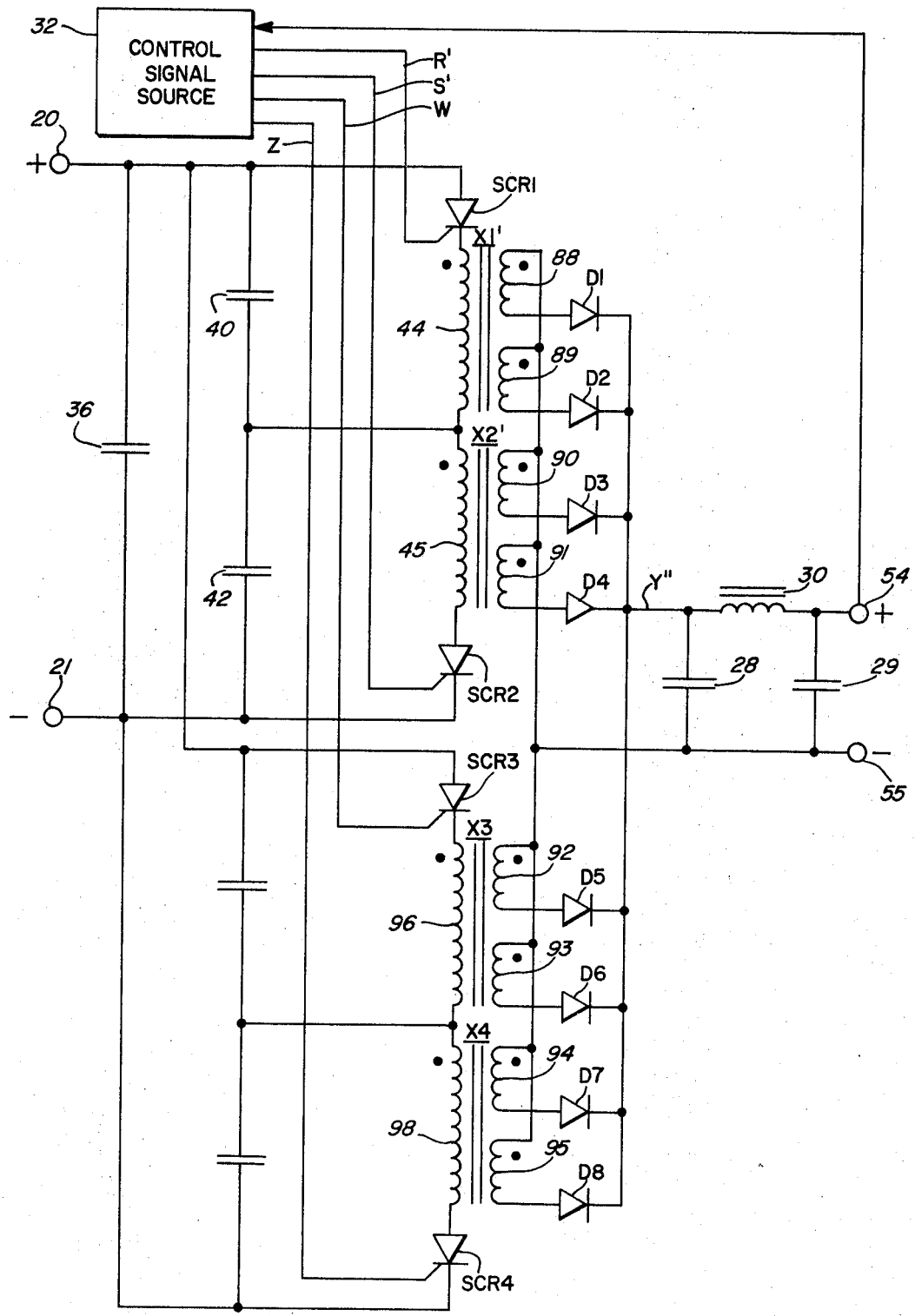
FIG. 6 is a schematic diagram of another embodiment of the instant invention.

FIG. 6 illustrates a second embodiment of the invention shown in FIG. 2 wherein like parts have similar reference characters. The circuit of FIG. 6 differs from the circuit of FIG. 2 in that it employs a plurality of four reactors and a corresponding plurality of four silicon controlled rectifiers and each reactor has a pair of secondary windings instead of open secondary winding, each secondary winding having a separated diode, Multiple secondary windings and associated diodes may be employed in very high-current regulators when it is desired to reduce the level of operating current per diode. Leakage inductance between the multiple secondary windings causes secondary currents to divide approximately equally between the multiple windings. While the circuit illustrated in FIG. 2 utilizes only one secondary winding for each reactor, it may be desirable in some cases to divide output currents by employing two or more secondary windings as illustrated in FIG. 6.

The structure of FIG. 6 comprises two separate networks with input and output circuits connected in parallel. Each of the two separate networks is substantially equivalent to the network of FIG. 2 with output filter networks including capacitors 28 and 29 and choke 30 of FIG. 2 merged into a single output filter network including capacitors 28 and 29 and choke 30 of FIg. 6. The four SCR's are controlled by a control signal source 32.

Figure 7:
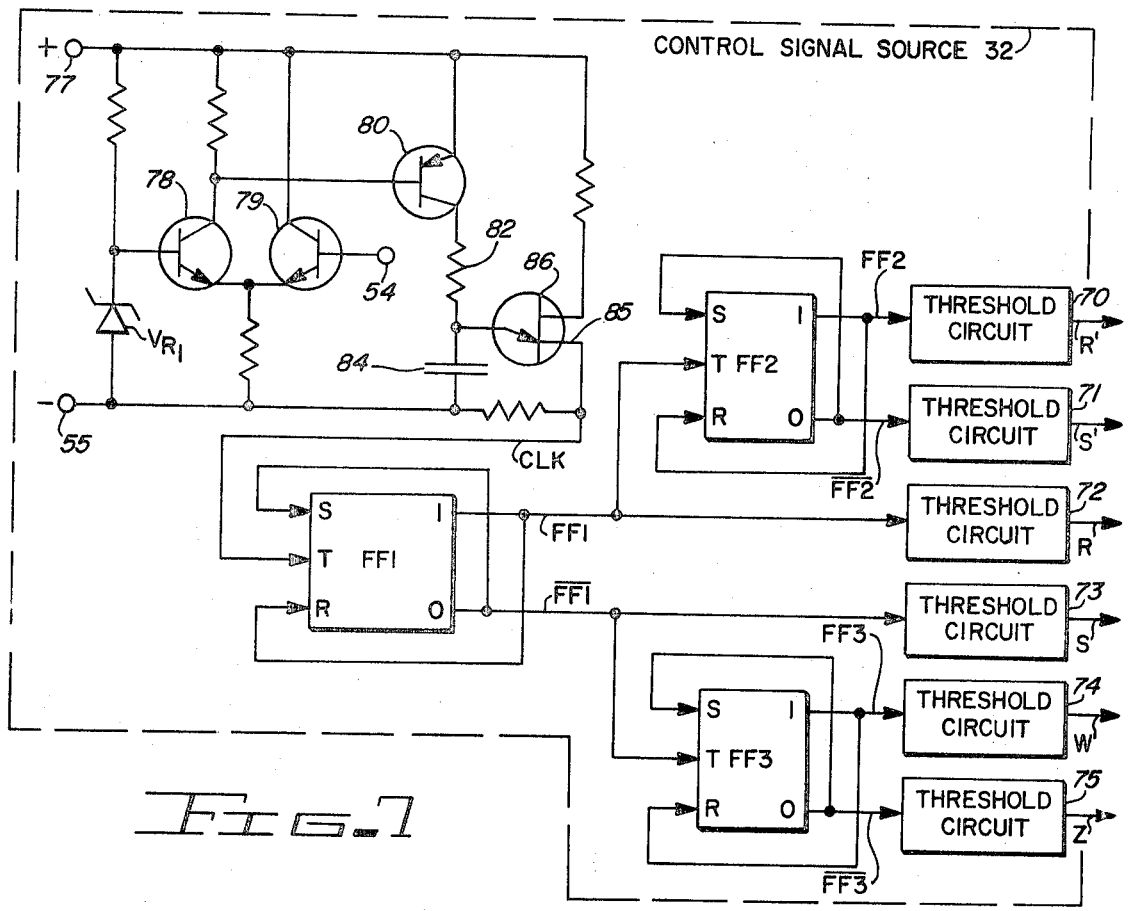
FIG. 7 is a schematic diagram of a controlled signal source suitable for use in the illustrated embodiment of FIG. 1, 2 and 6.

Control signal source 32 may be, by way of example, the circuit illustrated in FIG. 7 which consists of an oscillator circuit; three flip-flops; FF1, FF2 and FF3; and threshold circuits 70—75. The oscillator circuit may receive the output signal from the positive output terminal 54 of any of the circuits of FIGS.

1, 2 or 6 and the negative output signal may be received from the negative output terminal 55 of any of the circuits of FIGS. 1, 2 or 6. The oscillator circuit is energized by a suitable source of positive potential applying a suitable positive potential at a terminal 77. The potential is applied across a voltage regulator Zener diode VR1 which develops a positive reference potential for applying to a differential amplifier for comparison with the positive output voltage of a regulator.

Comparison is provided by a differential amplifier comprising transistors 78 and 79 for supplying an output signal to an amplifier transistor 80 which functions to supply a positive potential to a resistor capacitor combination comprised of a resistor 82 and capacitor 84 at the emitter of a unijunction transistor 86. As the differential amplifier detects changes in the output voltage of the switching regulator, it controls a base electrode 81 of transistor 80 in a way that will appropriately modify the charging rate of capacitor 84 thereby modifying a pulse repetition rate of unijunction transistor 86 which responds to provide a series of output CLK pulses occurring at a predetermined frequency on a CLK output lead.

Figure 8:
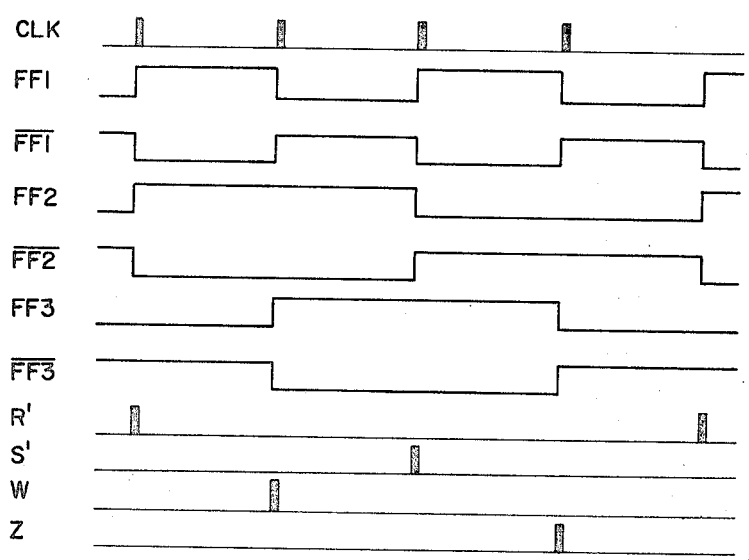
FIG. 8 illustrates waveforms which are useful in explaining the operation of the circuit shown in FIGS. 6 and 7.

Variations in frequency of the CLK pulses developed at a lower base electrode 85 of transistor 86 are used to compensate for variations in the unregulated DC input voltage and for load conditions at the output of the switching regulator whereby the output voltage is maintained at a constant value independent of source voltage and load conditions. As illustrated in FIG. 8, the CLK pulses are provided at regular intervals and are applied to a T input terminal of a flip-flop FF1.

Flip-Flops FF1, FF2 and FF3 are each well-known trigger flip-flops which require a positive input signal applied to the T input terminal in conjunction with a positive or enabling signal applied to a S input terminal to place the flip-flop in a set or 1 state and when applied in conjunction with a positive or enabling signal to a R input terminal will place the flip-flop in a reset or 0 state.

In response to repetitive CLK pulses the FF1 flip-flop provides FF1 and $\overline{FF1}$ output signals from its 1 and 0 output terminals, respectively, as illustrated in the FF1 and $\overline{FF1}$ waveforms of FIG. 8. The FF1 and $\overline{FF1}$ output signals are applied to the T input terminals of flip-flops FF2 and FF3, respectively, to result in output signals in accordance with the FF2, $\overline{FF2}$, FF3 and $\overline{FF3}$ waveforms illustrated in FIG. 8. Output signals from each of the flip-flops FF1, FF2 and FF3 are applied to a respective one of threshold circuits 70—75 to provide R', S', R, S, W and Z output signals, respectively, as indicated in the corresponding waveforms of FIGS. 4 and 8.

The switching regulator circuit of FIG. 6 operates in response to R', S', W and Z pulses appearing in the R', S', W and Z waveforms illustrated in FIG. 8 and received from control signal source 32 to provide an output current signal represented by waveform Y" of FIG. 5. Assuming that flip-flop FF1 had been placed in a set state in response to a first CLK pulse to generate a high or enabling FF1 signal to place flip-flop FF2 in a set state thereby providing a high or enabling FF2 signal and the R' pulse which was applied to the gate of SCR1, the next CLK pulse will place the flip-flop FF1 in a reset state to provide a high or enabling $\overline{FF1}$ signal to the T input terminal of FF3. Provided that the FF3 flip-flop had been in a reset state, flip-flop FF3 would be placed in a set state to provide a positive output signal to threshold circuit 74 which responds to provide a positive output pulse illustrated in a W waveform of FIG. 8. The S' and Z waveforms of FIG. 8 are similarly generated by output signals from the FF1, FF2 and FF3 flip-flops.

Threshold circuits 70—75 may be, by way of example, a well-known Schmitt trigger circuit which produces an output voltage of a given level in response to input voltages, which exceed a predetermined threshold level. The threshold circuit may, by way of example, provide an output pulse of a predetermined width in response to an input signal which exceeds a +0.4 volt level.

Thus, the threshold circuits 70 through 75 provide output signal pulses which may be utilized to control the silicon controlled rectifiers illustrated in FIGS. 1, 2 and 6. The circuit of FIG. 7 provides for a sequence of providing the R', S', W and Z pulses sequentially in a predetermined order to singly fire selected ones of SCR's 1—4 of FIG. 6 and the R and S pulses in accordance with waveforms R and S of FIG. 4 for utilization in controlling the circuit of FIG. 2. It is to be understood that the unijunction transistor 86 of control signal source 32 is adjusted by the output voltage of the switching regulator to provide output CLK pulses at a required frequency to permit flip-flop FF1 to generate the R and S signals from threshold circuits 72 and 73 in accordance with the R and S signals from threshold circuits 72 and 73 in accordance with the R and S waveforms of FIG. 4.

Control signal source 32 must be designed to assure that a given SCR will not be fired until the reactor to which it applies a current pulse has recovered from its previous reactor cycle of operation. In the case of the illustrated prior art of FIg. 1, source 32 must be disabled until the completion of the recovery from a previous reactor cycle.

With reference to FIg. 6, the top half of the circuit in which the X1 and X2 reactors appear will operate in a manner similar to that described previously for the two-reactor circuit illustrated in FIG. 2. In a like manner the lower half of the circuit of FIG. 6 will operate in a manner similar to that of the top half of the circuit.

A sequence of operation for the circuit of FIG. 6 will now be described with reference to FIGS. 6 and 8. The R' pulse will fire SCR1 and provide a SCR1 current pulse as illustrated in waveform T" which is applied through the primary winding 44 of reactor X1. Reactor X1 will respond to provide the combined currents illustrated in waveform M' through secondary windings 88 and 89 and in diodes D1 and D2 to the output filter comprised of capacitors 28 and 29 and choke coil 30. Control signal source 32 next provides the W pulse illustrated in FIG. 8 to SCR3 of FIG. 6 which responds to provide the SCR3 current pulse of waveform T", FIG. 5, through the primary winding 96 of reactor X3. Reactor X3 responds to provide the combined currents illustrated in waveform N' through secondary windings 92 and 93 and in diodes D5 and D6 to the output filter.

Following the W pulse, source 32 provides a S' pulse to SCR2, FIG. 6, which responds to provide the SCR2 current pulse of waveform T" through primary winding 45 of reactor X2 resulting in an output current through secondary windings 90 and 91 and in diodes D3 and D4 represented by waveform 0 of FIG. 5. Source 32 next provides the Z pulse to SCR4, FIG. 6, to provide the SCR4 current pulse of waveform T" through primary winding 98 of reactor X4. Reactor X4 responds by providing output current in secondary windings 94 and 95 and in diodes D7 and D8 as represented by waveform P of FIG. 5.

As shown in FIG. 5, the currents in diodes D1—D8 represented by waveforms M', N', O and P overlap in time and are additive flowing into the output filter at the terminals of the output filter capacitor 28 of FIG. 6. The sum of the overlapped currents is illustrated by waveform Y" of FIG. 5. A resulting combined current in diodes D1—D8 as represented by waveform Y" has a ripple current which is approximately one-half the amplitude of the ripple current for the two-reactor circuit of FIG. 2. As previously described, the two-reactor circuit provides a ripple reduction to one-half of the ripple current of the single-reactor prior art circuit illustrated in FIG. 1. A significant reduction in ripple current thus results when a plurality of reactors is employed as compared with the ripple current for a single-reactor switching regulator circuit.

With reference to FIGS. 3, 4 and 5, waveforms T, T' and T" represent the input current pulses flowing through the primary windings of the reactors of the circuits of FIGS. 1, 2 and 6, respectively. Each time a current pulse is caused to flow in a primary winding of one of the reactors, X1 to X4, the AC component of a similar current pulse having a peak amplitude equal to one-half the peak amplitude of the T, T' or T" current pulse will flow through input filter capacitor 36. The RMS value of this AC ripple current flowing through the input filter capacitor will also be found to be inversely proportional to the number of reactors employed in the switching regulator circuit, that is, for equivalent power ratings, the AC ripple current in the input filter capacitor for the circuit of FIG. 2 will be approximately half that of the prior art circuit of FIG. 1 and the RMS value of the AC ripple current in the input filter capacitor of FIG. 6 will be approximately one-half that of the circuit of FIG. 2. Therefore, a significant reduction in the peak ripple current experienced by both input and output filter capacitors is achieved by utilizing a plurality of reactors in a circuit wherein the input currents are sequentially applied to different ones of the reactors in a predetermined sequence. The lower ripple currents permit a significant reduction in thermal losses, size, weight and cost of the switching regulator.

Accordingly, a plurality of reactors may be employed in a circuit having a corresponding number of SCR's, each controllable rectifier being utilized for controlling the application of input current pulses to a corresponding reactor whereby output current pulses from the reactors may be overlapped to provide reduced ripple at given output currents in response to lower level input current pulses.

Thus, the objects set forth herein are realized by the instant invention wherein a novel switching regulator provides high output currents with reduced ripple currents. This invention eliminates excessively large filter capacitors resulting in reduced volume and weight for a switching regulator providing a given current output rating. Furthermore, an increase in efficiency resulting from the education in ripple currents is provided by the switching regulator of this invention thereby requiring a reduced amplitude input current to provide a given output current and reducing the amount of heat energy which must be removed by the cooling system.

While the principles of the invention have now been made clear in an illustrative embodiment, there will be immediately obvious to those skilled in the art many modifications of structure, arrangement, proportions, the elements, materials and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

We claim:

1. A switching regulator circuit for use with a power supply having a positive and a negative terminal, said circuit comprising: A control signal source for providing a first and a second control signal; first and second inductive reactors, each having a primary and a secondary winding; first and second controllable rectifiers, each having an anode, a cathode and a gate, said first rectifier being connected in series with said primary winding of said first reactor in a first series combination and said second rectifier being connected in series with said primary winding of said second reactor in a second series combination, said first and second series combinations being connected together at a second end and at a first end of said first and second combinations, respectively, said first combination being connected to said positive terminal of said supply at a first end of said first combination and said second combination being connected to said negative terminal of said supply at a second end of said second combination, and said source being connected to said gate of said first and second rectifiers for applying said first and second control signals to a corresponding one of said rectifiers; first, second, third and fourth capacitors, said first capacitor being connected between said positive and negative terminals of said supply, said second capacitor being connected between said first and second ends of said first combination and said third capacitor being connected between said first and second ends of said second combination; and first and second diodes, each of said diodes corresponding to a respective one of said reactors and having a first and a second electrode, a first electrode of each of said first and second diodes being connected to a first end of a secondary winding of a corresponding one of said reactors and said fourth capacitor being connected between the second electrodes of each one of said first and second diodes and a second end of the secondary winding of each one of said reactors.

2. The switching regulator circuit of claim 1 wherein said first control signal is applied to said gate of the first controllable rectifier at a time when a quantity of stored energy in said second reactor is being discharged through the secondary winding of said second reactor and said second control signal is applied to said gate of the second controllable rectifier at a time when a quantity of stored energy in said first reactor is being discharged through said secondary winding of said first reactor, said first and second control signals being alternately and successively applied to said gates of said first and second rectifiers.

3. A switching regulator circuit for use with a power supply having a positive and a negative terminal, said circuit comprising: A control signal source for providing a first and a second control signal; first and second inductive reactors, each having a primary and a secondary winding; first and second controllable rectifiers, each having an anode, a cathode and a gate, said anode of said first rectifier being connected to said positive terminal of said supply, said cathode of said first rectifier being connected to a first end of said primary winding of said first reactor, said anode of said second rectifier being connected to a first end of said primary winding of said second reactor, said cathode of said second rectifier being connected to said negative terminal of said supply and said source being connected to said gate of said first and second rectifiers for applying said first and second control signals to a corresponding one of said rectifiers; first, second, third and fourth capacitors, said first capacitor being connected between said positive and negative terminals of said supply, said second capacitor being connected between said positive terminal and a second end of said primary winding of the first reactor and said third capacitor being connected between a second end of said primary winding of the second reactor and said negative terminal of said supply, said second ends of said primary windings of said first and second reactors being connected together; and first and second diodes, each having an anode and a cathode, an anode of each of said first and second diodes being connected to a first end of the secondary winding of a corresponding one of said reactors and said fourth capacitor being connected between the cathodes of said first and second diodes and a second end of the secondary winding of each one of said reactors.

4. The switching regulator circuit of claim 3 wherein said first and second inductive reactors are linear reactors.

5. The switching regulator circuit of claim 3 wherein said first control signal is applied to said gate of the first controllable rectifier at a time when a quantity of stored energy in said second reactor is being discharged through the secondary winding of said second reactor and said second control signal is applied to said gate of the second controllable rectifier at a time when a quantity of stored energy in said first reactor is being discharged through said secondary winding of said first reactor, said first and second control signals being alternately and successively applied to said gates of said first and second rectifiers.

6. A switching regulator circuit for use with a power supply having a positive and a negative terminal, said circuit comprising: A control signal source for providing a first and a second control signal; first and second inductive reactors, each having a primary and a plurality of secondary windings; first and second controllable rectifiers, each having an anode, a cathode and a gate, said anode of said first rectifier being connected to said positive terminal of said supply, said cathode of said first rectifier being connected to a first end of said primary winding of said first reactor, said anode of said second rectifier being connected to a first end of said primary winding of said second reactor, said cathode of said second rectifier being connected to said negative terminal of said supply and said source being connected to said first and second rectifiers to apply said first and second control signals to a corresponding one of said rectifiers; first second, third and fourth capacitors, said first capacitor being connected between said positive and negative terminals of said supply, said second capacitor being connected between said positive terminal and second end of said primary winding of the first reactor, said third capacitor connected between a second end of said primary winding of the second reactor, and said second ends of said primary windings of said first and second reactors being connected together; and a plurality of diodes, each having an anode and a cathode, an anode of each of said plurality of diodes being connected to a first end of a corresponding one of said plurality of secondary windings for each of said reactors and said fourth capacitor being connected between the cathodes of each of said plurality of diodes and a second end of each of the plurality of secondary windings of said reactors.

7. A switching regulator circuit for use with a power supply having a positive and a negative terminal, said circuit comprising: A control signal source for providing a plurality of control signals; a plurality of pairs of inductive reactors, each of said pairs having a first and a second inductive reactor, each having a primary and a secondary winding; a plurality of pairs of controllable rectifiers, each of said pairs having a first and a second controllable rectifier corresponding to a respective first and second inductive reactor of one of said pairs of inductive reactors, each of said rectifiers having an anode, a cathode and a gate, said anode of said first rectifier being connected to said positive terminal of said supply, said cathode of said first rectifier being connected to a first end of said primary winding of a respective first reactor, said anode of said second rectifier being connected to a first end of said primary winding of a respective second reactor, said cathode of said second rectifier being connected to said negative terminal of said supply and said source being connected to said gate of said first and second rectifiers to apply a different one of said plurality of said control signals to a corresponding one of said rectifiers; a first capacitor being connected in parallel between said anode of said first rectifier and said cathode of said second rectifier of each of said pairs of rectifiers; a plurality of sets of capacitors, each of said sets of capacitors corresponding to a pair of said plurality of pairs of inductive reactors, and each of said sets having a second and a third capacitor, each of said second capacitors being connected between said positive terminal and a second end of said primary winding of the first reactor of a corresponding pair of reactors, each of said third capacitors being connected between a second end of said primary winding of the second reactor of a corresponding pair of reactors and said negative terminal, and said second ends of said primary windings being connected together; a plurality of diodes, each diode corresponding to a respective one of said reactors and having an anode and a cathode; anode of each of said diodes being connected to a first end of the secondary winding of a corresponding reactor; and a fourth capacitor being connected between the cathodes of each of said plurality of diodes and a second end of the secondary windings of each of said plurality of reactors.

8. The switching regulator circuit of claim 7 wherein the plurality of control signals provided by said control signal source is applied singly and sequentially to each of said controllable rectifiers in a predetermined sequence, a control signal being applied to each rectifier at a time during which a quantity of stored energy in at least one reactor corresponding to at least one other rectifier receiving a preceding control signal is being discharged through its associated secondary winding.

9. The switching regulator circuit of claim 7 wherein the plurality of control signals provided by said control signal source is applied singly and sequentially to each of said controllable rectifiers in a predetermined sequence, a control signal being applied to each of said first and second rectifiers alternately and at a time during which a quantity of stored energy in at least one reactor corresponding to at least one other rectifier receiving a preceding control signal is being discharged through its associated secondary winding.

10. A switching regulator circuit for use with a power supply having a positive and a negative terminal, said circuit comprising: A control signal source for providing a plurality of control signals; a plurality of pairs of inductive reactors, each of said pairs having a first and a second inductive reactor, each having a primary winding and a plurality of secondary windings; a plurality of pairs of controllable rectifiers, each of said pairs having a first and a second controllable rectifier corresponding to a respective first and second inductive reactor of one of said pairs of inductive reactors, each of said rectifiers having an anode, a cathode and a gate, said anode of said first rectifier being connected to said positive terminal of said supply, said cathode of said first rectifier being connected to a first end of said primary winding of a respective first reactor, said anode of said second rectifier being connected to a first end of said primary winding of a respective second reactor, said cathode of said second rectifier being connected to said negative terminal of said supply and said source being connected to said gate of said first and second rectifiers to apply a different one of said plurality of said control signals to a corresponding one of said rectifiers;

a first capacitor being connected in parallel between said anode of said first rectifier and said cathode of said second rectifier of each of said pairs of rectifiers; a plurality of sets of capacitors, each of said sets of capacitors corresponding to a pair of said plurality of pairs of inductive reactors, and each of said sets having a second and a third capacitor, each of said second capacitors being connected between said positive terminal and a second end of said primary winding of the first reactor of a corresponding pair of reactors, each of said third capacitors being connected between a second end of said primary winding of the second reactor of a corresponding pair of reactors and said negative terminal, and said second ends of said primary windings being connected together; a plurality of diodes, each of said diodes corresponding to a respective one of said windings and having an anode and a cathode; an anode of each of said plurality of diodes being connected to a first end of a corresponding secondary winding; and a fourth capacitor being connected between the cathodes of each of said plurality of diodes and a second end of the secondary windings of each of said plurality of reactors.

11. A switching regulator circuit for use with a power supply having a positive and a negative terminal, said circuit comprising: A control signal source for providing a first, a second, a third and a fourth control signal; first, second, third and fourth inductive reactors, each having a primary and a secondary winding; first, second, third and fourth controllable rectifiers, each having an anode, a cathode and a gate, said anode of said first rectifier being connected to said positive terminal of said supply, said cathode of said first rectifier being connected to a first end of said primary winding of said first reactor, said anode of said second rectifier being connected to a first end of said primary winding of said second reactor, said cathode of said second rectifier being connected to said negative terminal of said supply and said source being connected to said gate of said first and second rectifiers for applying said first and second control signals to the gate of said first and second rectifiers, respectively, said cathode of said third rectifier being connected to a first end of said primary winding of said third reactor, said anode of said fourth rectifier being connected to a first end of said primary winding of said fourth reactor, said cathode of said fourth rectifier being connected to said negative terminal of said supply and said source being connected to said gate of said third and fourth rectifiers for applying said third and fourth control signals to the gate of said third and fourth rectifiers, respectively; a first capacitor being connected between said positive and negative terminals of said supply; second, third, fourth, fifth and sixth capacitors, said second capacitor being connected between said positive terminal and a second end of said primary winding of the first reactor and said third capacitor being connected between a second end of said primary winding of the second reactor and said negative terminal, said fourth capacitor being connected between said positive terminal and a second end of said primary winding of the third reactor and said fifth capacitor being connected between a second end of said primary winding of the fourth reactor and said negative terminal, said second ends of said primary windings of said first and second reactors being connected together, and said second ends of said primary windings of said third and fourth reactors being connected together; first, second, third and fourth diodes, each of said diodes corresponding to a respective one of said reactors and having an anode and a cathode, an anode of each of said diodes being connected to a first end of the secondary winding of a corresponding one of said reactors, said sixth capacitor being connected between the cathodes of each of said diodes and a second end of the secondary winding of each of said reactors; and said control signal source providing said first, second, third and fourth control signals singly and sequentially to the gates of each of said first, second, third and fourth rectifiers, said first control signal being applied to the gate of the first rectifier at a time when a quantity of energy stored in said second, third and fourth reactors is being transferred into a respective secondary winding, said second control signal being applied to said second rectifier when a quantity of energy stored in said first, third and fourth reactors is being transferred into a respective secondary winding, said third control signal being applied to said third rectifier when a quantity of energy stored in said first, second and fourth reactors is being transferred into a respective secondary winding, and said fourth control signal being applied to said fourth rectifier when a quantity of energy stored in said first, second and third reactors is being transferred into a respective secondary winding.